(12) United States Patent
Lambers

(10) Patent No.: US 10,554,083 B2
(45) Date of Patent: Feb. 4, 2020

(54) PUMP WITH ELECTRIC MOTOR

(71) Applicant: OASE GmbH, Hörstel-Riesenbeck (DE)

(72) Inventor: Herbert Lambers, Hörstel (DE)

(73) Assignee: OASE GmbH, Hörstel-Riesenbeck (DE)

(*) Notice: Subject to any disclaimer, the term of this patent is extended or adjusted under 35 U.S.C. 154(b) by 210 days.

(21) Appl. No.: 15/043,563

(22) Filed: Feb. 14, 2016

(65) Prior Publication Data

US 2016/0241097 A1  Aug. 18, 2016

(30) Foreign Application Priority Data

Feb. 16, 2015  (DE) .................. 10 2015 102 207

(51) Int. Cl.
*H02K 1/30* (2006.01)
*H02K 1/27* (2006.01)
*H02K 15/03* (2006.01)
*H02K 7/04* (2006.01)

(52) U.S. Cl.
CPC ............. *H02K 1/30* (2013.01); *H02K 1/2706* (2013.01); *H02K 1/278* (2013.01); *H02K 7/04* (2013.01); *H02K 15/03* (2013.01)

(58) Field of Classification Search
CPC .. H02K 1/28; H02K 1/27–1/2793; H02K 1/04
USPC ............... 310/156.08, 156.09–156.12
See application file for complete search history.

(56) References Cited

U.S. PATENT DOCUMENTS

| | | | | |
|---|---|---|---|---|
| 4,933,583 A | * | 6/1990 | Ripplinger | H02K 1/278 310/156.22 |
| 5,801,470 A | * | 9/1998 | Johnson | H02K 1/2733 310/156.27 |
| 5,898,990 A | | 5/1999 | Henry | |
| 2007/0018521 A1 | | 1/2007 | Ishiguro et al. | |
| 2008/0048517 A1 | * | 2/2008 | Ochiai | H02K 1/278 310/216.004 |
| 2009/0261678 A1 | * | 10/2009 | Sortore | H02K 1/2753 310/156.31 |
| 2013/0214620 A1 | * | 8/2013 | Kobayashi | H02K 1/278 310/43 |
| 2014/0028119 A1 | * | 1/2014 | Sagalovskiiy | H02K 1/278 310/43 |

(Continued)

FOREIGN PATENT DOCUMENTS

DE  84 27 706.8 U1  3/1986

OTHER PUBLICATIONS

"Embedded, adj." OED Online. Oxford University Press, Jun. 2019. Web. Jul. 2, 2019. (Year: 2019).*

(Continued)

*Primary Examiner* — Thomas Truong
(74) *Attorney, Agent, or Firm* — Gudrun E. Huckett

(57) ABSTRACT

A pump is provided with an electric motor that has a rotor. The rotor is provided with a shaft and a magnet surrounds the shaft. The magnet is connected with form fit to the shaft. A follower surrounds the shaft at least in some areas of the shaft. The follower is monolithically connected to the shaft or is connected with form fit to the shaft. The magnet is made of at least two magnet segments and the follower has projections which engage intermediate spaces formed between the magnet segments.

7 Claims, 4 Drawing Sheets

(56) References Cited

U.S. PATENT DOCUMENTS

2017/0033626 A1* 2/2017 Hartmann .............. H02K 1/278

OTHER PUBLICATIONS

Wikipedia: Auswuchten (translation: counterbalancing), version dated Jan. 14, 2015; discloses on p. 2 (1st sentence under the heading "Rotierende Maschinen und Maschinenteile") counterbalancing of rotors of electric motors effected by bores, flat cutouts, or notches that are cut into the lamination stack of the rotor.
Senner, A. (editor): Fachkunde Elektrotechnik, 7th edition, 1965, Wuppertal-Barmen, Germany; pp. 179-180; discloses under the heading "7.1.3. Auswuchten" dynamic and static counterbalancing of rotors of electric motors; counterbalancing by drilling, milling grinding or by adding material (riveting, brazing, welding) is disclosed (see last sentence of p. 180).

* cited by examiner

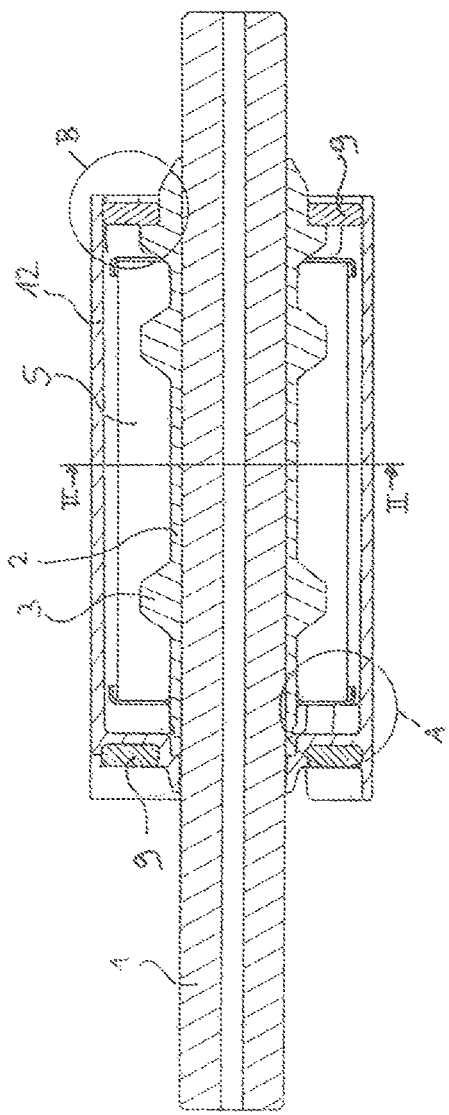
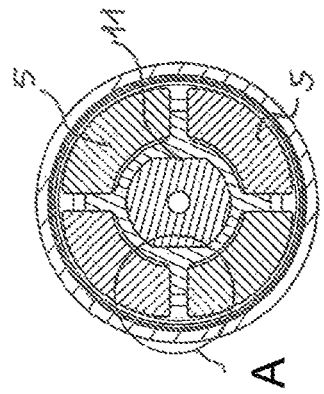
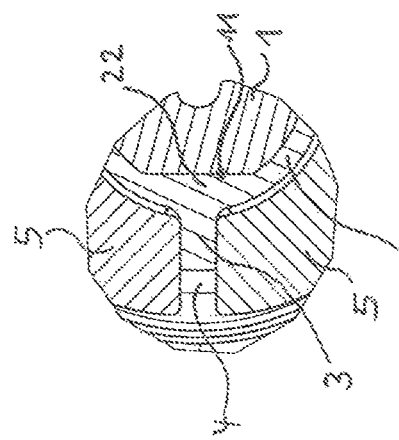
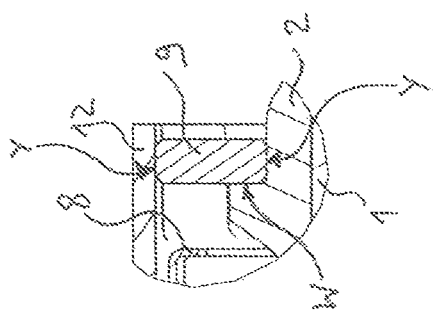
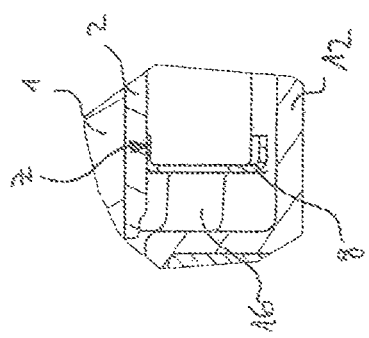

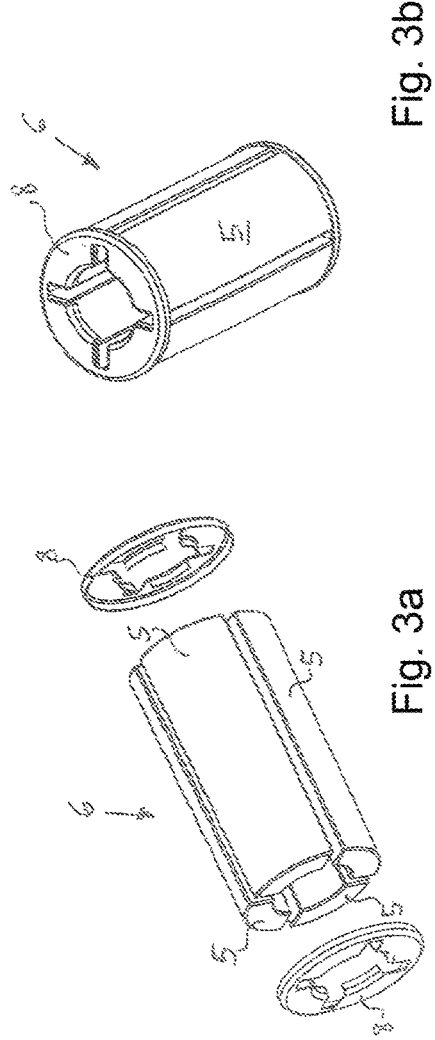
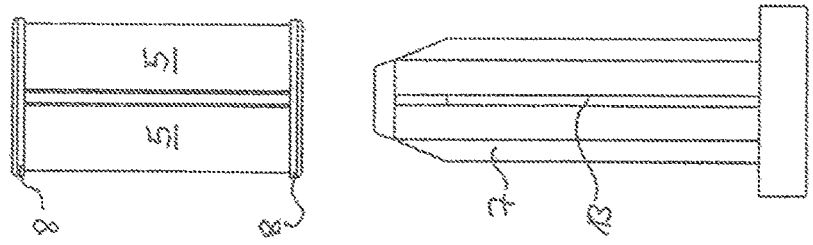
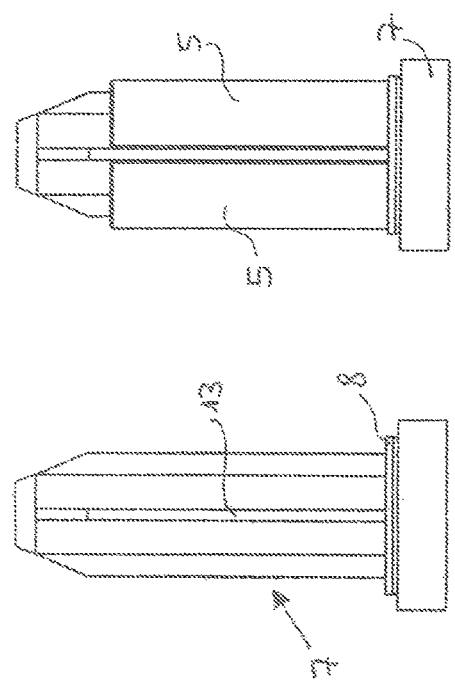
Fig. 3a
Fig. 3b
Fig. 3c
Fig. 3d
Fig. 3e
Fig. 3f

PUMP WITH ELECTRIC MOTOR

BACKGROUND OF THE INVENTION

The invention relates to a pump with electric motor, in particular a liquid pump, wherein the electric motor comprises a rotor comprising a shaft and a magnet surrounding the shaft.

In pumps that, on the one hand, require a small size but, on the other hand, also a particularly high-performance electric motor, the rotor in practice is formed of a metal shaft or ceramic shaft and a magnet is pushed onto the shaft and then glued to the shaft. Usually, the shaft is subsequently embedded in plastic material. This configuration enables a very compact construction but the transmittable torque depends primarily on the selected adhesive connection. Also, the adhesive connections are partially subject to material fatigue so that the service life in regard to loadability is limited. In order to ensure the required connecting strength, the adhesive connection must therefore be of extremely high quality and is therefore very expensive.

It is therefore an object of the present invention to provide a pump of the aforementioned kind that, by means of the rotor construction of the electric motor, enables with beneficial conditions a high performance while providing a compact configuration of the electric motor. This is particularly relevant for pond pumps or aquarium pumps that must combine a minimal size with high performance.

SUMMARY OF THE INVENTION

In accordance with the present invention, this is achieved in that the magnet of the electric motor is connected with form fit to the shaft in order to form the rotor. For this purpose, at least a section of the shaft is provided with at least one follower. The follower can be formed monolithic with the shaft or can be a separate element that is connected in particular with form fit to the shaft. The follower may comprise one or a plurality of projections or recesses which, in the finish-mounted state of the rotor, are connected with form fit with the magnet. Particularly preferred, the follower is designed as a sleeve and is pushed onto the shaft or the follower is injection-molded around the shaft. Form fit can be realized in this connection in that the shaft has at least one flat portion and an appropriately shaped wall section of increased thickness of the sleeve is resting with precise form fit on this flat portion.

For facilitating assembly, the magnet can be preferably comprised of several magnet segments. These magnet segments are preferably designed as circular ring segments. When the follower comprises appropriate projections, these projections can engage the intermediate spaces between the magnet segments so that, for a fixed connection of the magnet segments, also form fit between the magnet, comprised of the magnet segments, and the shaft is provided. For forming a magnet component group, in particular in the form of an annular magnet, it is advantageous to provide the magnet segments at one end with at least one end cap securing the magnet segments; preferably however both ends are provided with such an end cap. The connection between the end caps and the magnet segments can be realized with form fit, for example, by a clamping action, or with an adhesive connection because this connection serves only for fixation and must not transmit great forces.

Preferably, the entire magnet component group is enclosed by a rotor jacket. The magnet component group can be embedded by casting within the rotor jacket or can be potted within the rotor jacket, i.e., surrounded by a potting compound in the rotor jacket.

Moreover, in the pump according to the invention at least one balancing element, for example, made of stainless steel, can be provided advantageously on the end face of the rotor. This balancing element can extend the service life of the rotor significantly while requiring only minimal material usage. When, as is conventional for balancing the rotor, one or several bores are introduced into the magnet itself, strong corrosion processes will occur in these bores that may afflict the entire magnet. When, on the other hand, as proposed herein, balancing bores are introduced into a separate balancing element, the magnet remains unharmed and there are no negative corrosion effects.

In order to simplify exact assembly of the rotor and to reduce the need for balancing, it is advantageous to provide the rotor with one or a plurality of centering elements for the shaft and/or for the magnet component group that immediately ensure correct positioning during assembly. It is preferable, and saves components, when the balancing element forms a centering element.

BRIEF DESCRIPTION OF THE DRAWING

Further advantages and details result from the claims and dependent claims as well as an embodiment of the invention described in the following.

FIG. 1 shows a rotor of the pump according to the invention in section view, detail views of detail A and B in FIG. 1 being shown in FIG. 1A and FIG. 1B.

FIG. 2 shows a cross-section of the rotor of FIG. 1 along section line II-II with detail A of FIG. 2 being shown in FIG. 2A.

FIGS. 3a and 3b show the magnet component group of FIGS. 1 and 2 in different perspective illustrations, with FIG. 3a showing an exploded view.

FIGS. 3c to 3f illustrate the assembly of the magnet component group.

FIG. 4a shows the rotor of FIG. 1 in an exploded view and FIG. 4b shows the rotor of FIG. 1 in assembled state, wherein

DESCRIPTION OF THE PREFERRED EMBODIMENTS

Figure 4B:
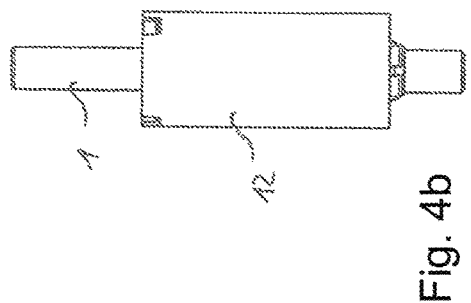

The rotor that is illustrated in FIGS. 1, 1A, 1B, 2, 2A, 4a, and 4b comprises a shaft 1 and a follower 2 that encloses the shaft 1, at least in some areas, like a sleeve. The follower 2 comprises projections 3 which, in the completely mounted state of the rotor, engage intermediate spaces that are formed between magnet segments 5.

The follower 2 is connected to the shaft 1 with form fit. In the illustrated embodiment, this is realized by lateral flat portions 11 (see FIG. 2) of the shaft 1 where wall sections of greater wall thickness 22 of the follower 2 are arranged that are matched precisely to the flat portions 11. By means of the projections 3 and the arrangement of magnet segments 5, the follower 2 is in turn connected with form fit to a magnet component group 6 that comprises the magnet segments 5 so that, indirectly, also a form-fit connection between the shaft 1 and the magnets 5, 6 is produced. The details can be seen in particular in FIG. 2A In FIGS. 3a to 3f, the magnet component group 6 as well as its assembly are illustrated. Assembly is realized preferably by using an assembly assist device 7 onto which first an end cap 8 is placed (FIG. 3c). The magnet segments 5 are positioned and secured with an adhesive on the end face of the end cap 8 (FIG. 3d). Projections 13 (see FIG. 3c) of the assembly assist device 7 that correspond to the projections 3 of the follower 2 assist in positioning the magnet segments 5. A further end cap 8 is secured to the top end faces of the magnet segments 5, also with the aid of an adhesive (FIG. 3e). After curing of the adhesive, the magnet component group 6 which in the embodiment forms an annular magnet can be removed in upward direction from the assembly assist device 7 (FIG. 3f).

Figure 4A:
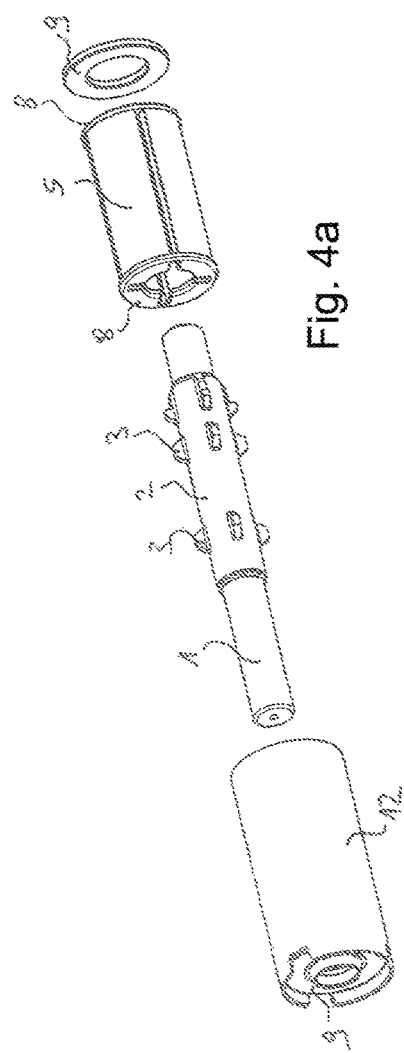
Figure 5E:
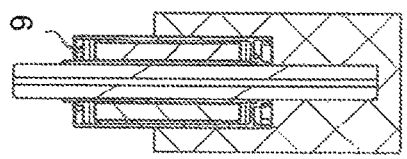
FIGS. 5a to 5e illustrate various steps of the assembly of the rotor.
Figure 5D:
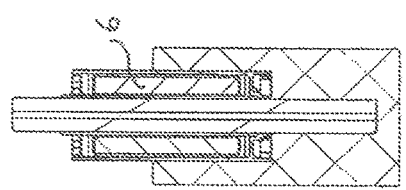
Figure 5C:
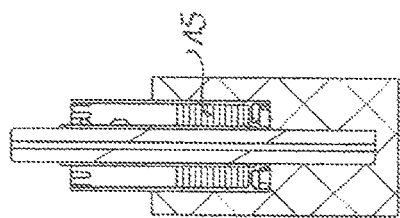
Figure 5B:
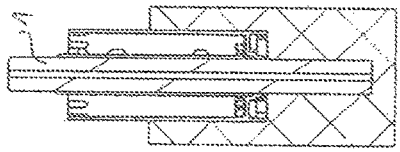
Figure 5A:
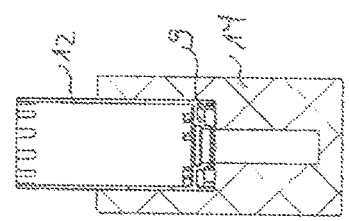
Figure 4C:
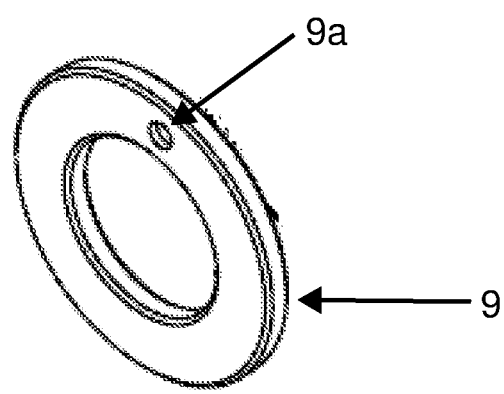
FIG. 4c shows a balancing element with an exemplary balancing bore.

FIGS. 4a and 4b show the finish-mounted rotor and FIGS. 5a to 5e illustrate how the rotor is assembled. For this purpose, a rotor jacket 12, preferably already provided at the bottom side with a balancing element 9 embedded by injection molding and thus forming a rotor cup, is inserted into a mounting device 14 (FIG. 5a). The shaft 1 which has been previously provided with the follower 2 is then inserted into the mounting device 14 until it impacts on a stop (FIG. 5b). The follower 2 is preferably injection molded about the shaft 1. FIG. 5c shows how a pre-metered quantity of potting compound 15 is filled into the voids of the rotor jacket 12 or rotor cup. In FIG. 5d, the magnet component group 6 is now placed with precise fit onto the shaft 11 and onto the follower 2 and, in doing so, portions of the potting compound 15 are displaced in upward direction so that the magnet component group 6 is completely embedded in the rotor jacket 12. As shown in FIG. 5e, the upper end face closure is formed by a further balancing element 9 which closes off the rotor jacket 12 or the rotor cup in upward direction and is also secured by the potting compound.

A future balancing of the rotor can be realized in a simple way by introducing bores 9a into the balancing element(s) 9.

The detail views of FIGS. 1A and 1B illustrate also how centering Z of the magnet component group 6 by means of their end caps 8 is realized at the follower 2 (FIG. 1A). For a supporting action in longitudinal direction of the shaft, the magnet component group 6 is contacting by means of its end cap 8 a stop 16 of the rotor jacket 12. FIG. 1B shows centering Y of the rotor jacket 12 by means of the balancing element 9 which forms a centering element in the embodiment. In the longitudinal direction of the shaft, the balancing element 9 is resting on a stop W of the follower 2 (FIG. 1B).

The rotor according to the invention enables in a simple and inexpensive but very stable way the production of the claimed pumps which are characterized by a small size, a high performance, and a long service life.

The specification incorporates by reference the entire disclosure of German priority document 10 2015 102 207.9 having a filing date of Feb. 16, 2015.

While specific embodiments of the invention have been shown and described in detail to illustrate the inventive principles, it will be understood that the invention may be embodied otherwise without departing from such principles.

What is claimed is:

1. A pump comprising:
an electric motor comprising a rotor;
the rotor comprising a shaft and a magnet component group, the magnet component group comprising a magnet surrounding the shaft;
the magnet connected with form fit to the shaft;
a rotor cup comprising a rotor jacket and a bottom side connected to the rotor jacket, wherein the magnet component group is disposed in an interior of the rotor cup, wherein the magnet component group is completely embedded in a potting compound by filling the potting compound into voids in the interior of the rotor cup, inserting the magnet component group into the potting compound to displace portions of the potting compound upwardly and completely embed the magnet component group in the potting compound;
balancing elements configured to receive balancing bores to balance the rotor, wherein the balancing elements include a first balancing element connected to an exterior face of the bottom side that is facing away from the interior of the rotor cup, wherein the balancing elements include a second balancing element that is arranged at an end face of the rotor cup opposite the bottom side and closes off the rotor cup;
wherein the rotor jacket and the bottom side of the rotor cup form a monolithic injection-molded part, wherein the first balancing element is secured to the bottom side of the rotor cup by being partially embedded by injection-molding in the bottom side, wherein the second balancing element is secured at the end face of the rotor cup by the potting compound.

2. The pump according to claim 1, further comprising a follower, wherein the follower surrounds the shaft at least in some areas of the shaft, wherein the follower is monolithically connected to the shaft or is connected with form fit to the shaft.

3. The pump according to claim 2, wherein the magnet is comprised of at least two magnet segments and wherein the follower comprises projections which engage intermediate spaces formed between the at least two magnet segments.

4. The pump according to claim 3, further comprising at least one end cap, wherein the at least two magnet segments are connected with the at least one end cap to form the magnet component group.

5. The pump according to claim 4, wherein the magnet component group is surrounded by the rotor jacket.

6. The pump according to claim 1, wherein the rotor comprises at least one centering element that centers the shaft.

7. The pump according to claim 6, wherein the balancing elements form the at least one centering element.

* * * * *